United States Patent
Zheng et al.

(10) Patent No.: US 11,288,577 B2
(45) Date of Patent: Mar. 29, 2022

(54) DEEP LONG SHORT TERM MEMORY NETWORK FOR ESTIMATION OF REMAINING USEFUL LIFE OF THE COMPONENTS

(71) Applicant: Hitachi, Ltd., Tokyo (JP)

(72) Inventors: Shuai Zheng, Arlington, TX (US);
Kosta Ristovski, San Jose, CA (US);
Chetan Gupta, San Mateo, CA (US);
Ahmed Farahat, Santa Clara, CA (US)

(73) Assignee: Hitachi, Ltd., Tokyo (JP)

(*) Notice: Subject to any disclaimer, the term of this patent is extended or adjusted under 35 U.S.C. 154(b) by 911 days.

(21) Appl. No.: 16/074,495

(22) PCT Filed: Oct. 11, 2016

(86) PCT No.: PCT/US2016/056459
§ 371 (c)(1),
(2) Date: Aug. 1, 2018

(87) PCT Pub. No.: WO2018/071005
PCT Pub. Date: Apr. 19, 2018

(65) Prior Publication Data
US 2019/0057307 A1  Feb. 21, 2019

(51) Int. Cl.
*G06N 3/08* (2006.01)
*G06N 3/04* (2006.01)
*G06F 11/00* (2006.01)
*G06F 11/30* (2006.01)

(52) U.S. Cl.
CPC ............. *G06N 3/08* (2013.01); *G06F 11/008* (2013.01); *G06N 3/0445* (2013.01); *G06N 3/0454* (2013.01); *G06N 3/084* (2013.01); *G06F 11/3006* (2013.01); *G06F 2201/81* (2013.01); *G06F 2201/835* (2013.01)

(58) Field of Classification Search
CPC ........ G06N 3/08; G06N 3/0454; G06N 3/084; G06N 3/0445
See application file for complete search history.

(56) References Cited

U.S. PATENT DOCUMENTS

| 9,961,096 | B1* | 5/2018 | Pierce ................. H04L 63/1425 |
| 10,410,132 | B2* | 9/2019 | Rastogi ..................... G01L 5/00 |
| 2011/0307160 | A1* | 12/2011 | Verdegan ........... G01N 15/0826 |
| | | | 701/102 |

(Continued)

OTHER PUBLICATIONS

Wang et al., "Failure time prediction for mechanical device based on the degradation sequence", Published online: Dec. 5, 2013, J Intell Manuf. 26:1, pp. 1181-1199. (Year: 2013).*

(Continued)

*Primary Examiner* — Kamran Afshar
*Assistant Examiner* — Ying Yu Chen
(74) *Attorney, Agent, or Firm* — Procopio, Cory, Hargreaves & Savitch LLP

(57) ABSTRACT

Example implementations described herein are directed to systems and methods for estimating the remaining useful life of a component or equipment through the application of models for deriving functions that can express the remaining useful life over time. In an aspect, the failure acceleration time point is determined for a given type of component, and a function is derived based on the application of models on the failure acceleration time point.

13 Claims, 13 Drawing Sheets

(56) References Cited

U.S. PATENT DOCUMENTS

2014/0324747 A1* 10/2014 Crowder ............... G06N 3/086
  706/18
2018/0080305 A1* 3/2018 Jacks .................... G05B 19/02

OTHER PUBLICATIONS

Shi et al., "Health index synthetization and remaining useful life estimation for turbofan engines based on run-to-failure datasets", Sep. 16, 2016, Maintenance and Reliability 2016; 18 (4), pp. 621-631. (Year: 2016).*

Babu et al., "Deep Convolutional Neural Network Based Regression Approach for Estimation of Remaining Useful Life", Mar. 25, 2016, DASFAA 2016, Part I, LNCS 9642, pp. 214-228. (Year: 2016).*

Vichare et al., "Methods for Binning and Density Estimation of Load Parameters for Prognostics and Health Management", Apr. 2006, International Journal of Performability Engineering vol. 2, No. 2, pp. 149-161. (Year: 2006).*

Xie et al., "On changing points of mean residual life and failure rate function for some generalized Weibull distributions", Jan. 25, 2004, Reliability Engineering and System Safety 84 (2004), pp. 293-299. (Year: 2004).*

* cited by examiner

| Time stamp | Component ID | Sensor #1 |
|---|---|---|
| 6:30:00 | 222 | 13 |
| 6:35:00 | 222 | 12 |
| 6:40:00 | 222 | 13 |
| ... | ... | ... |
| 9:10:00 | 222 | 10 |
| 9:15:00 | 222 | 11 |
| 9:20:00 | 222 | 11 |
| 9:25:00 | 222 | 13 |
| 9:30:00 | 222 | 11 |
| 0:05:00 | 224 | 10 |
| ... | | ... |

FIG. 4(a)

| Time stamp | Component ID | Sensor #2 |
|---|---|---|
| 6:30:00 | 222 | 234 |
| 6:40:00 | 222 | 231 |
| ... | ... | ... |
| 9:10:00 | 222 | 235 |
| 9:20:00 | 222 | 233 |
| 9:30:00 | 222 | 229 |
| 0:10:00 | 224 | 236 |
| ... | | ... |

FIG. 4(b)

| Time stamp | Component ID | Operating Condition |
|---|---|---|
| 6:35:00 | 222 | Operating |
| 9:15:00 | 222 | Not Operating |
| 9:25:00 | 222 | Operating |
| 0:15:00 | 224 | Operating |
| ... | | ... |

FIG. 4(c)

| Time stamp | Component ID | Events |
|---|---|---|
| 9:15:00 | 222 | Regular Maintenance |
| ... | | ... |

FIG. 4(d)

| Operating Time | Component ID | Sensor #1 |
|---|---|---|
| 2:00:00 | 222 | 13 |
| 2:05:00 | 222 | 12 |
| 2:10:00 | 222 | 13 |
| ... | ... | ... |
| 4:40:00 | 222 | 10 |
| 4:45:00 | 222 | 11 |
| 4:50:00 | 222 | 13 |
| 1:55:00 | 224 | 10 |
| ... | | ... |

FIG. 4(e)

| Operating Time | Component ID | Sensor #m |
|---|---|---|
| 2:00:00 | 222 | 234 |
| 2:10:00 | 222 | 231 |
| ... | ... | ... |
| 4:40:00 | 222 | 235 |
| 4:50:00 | 222 | 229 |
| 2:00:00 | 224 | 236 |
| ... | | ... |

FIG. 4(f)

| Operating Time | Component ID | Events |
|---|---|---|
| 4:45:00 | 222 | Regular Maintenance |
| ... | | ... |

FIG. 4(g)

| Operating Time | Component ID | Sensor #1 | ... | Sensor #m | Regular Maintenance | Failure |
|---|---|---|---|---|---|---|
| 2:00:00 | 222 | 13 | ... | 234 | 0 | 0 |
| 2:05:00 | 222 | 12 | ... | 232 | 0 | 0 |
| 2:10:00 | 222 | 13 | ... | 231 | 0 | 0 |
| ... | ... | ... | ... | | ... | ... |
| 4:40:00 | 222 | 10 | ... | 235 | 0 | 0 |
| 4:45:00 | 222 | 11 | ... | 232 | 1 | 0 |
| 4:50:00 | 222 | 13 | | 229 | 0 | 1 |
| 1:55:00 | 224 | 10 | | 233 | 0 | 0 |
| ... | | ... | ... | ... | ... | ... |

FIG. 4(h)

| Operating Time | Component ID | Mean sensor #1 | Max sensor #1 | ... | Max Sensor #m | Regular Maintenance | Failure |
|---|---|---|---|---|---|---|---|
| 3:00:00 | 222 | 12 | 13 | ... | 234 | 0 | 0 |
| 5:00:00 | 222 | 11 | 13 | ... | 235 | 1 | 1 |
| 1:00:00 | 224 | 10 | 12 | ... | 233 | 0 | 0 |
| ... | ... | ... | ... | ... | | ... | ... |

FIG. 4(i)

DEEP LONG SHORT TERM MEMORY NETWORK FOR ESTIMATION OF REMAINING USEFUL LIFE OF THE COMPONENTS

BACKGROUND

Field

The present disclosure is generally related to predictive maintenance, and more specifically, to analysis of remaining useful life of components of a system.

Related Art

Remaining Useful Life (RUL) is the time remaining before the component or a system reaches end-of-life. In some approaches for RUL estimation, time sequence information was taken into account by applying sliding windows over the data sequence. Regression models to predict RUL are built over the windows where for each window from historical data value of RUL is assigned. However, created windows in these models are considered independent. To address sequence information Recurrent Neural Network (RNN) and Hidden Markov Models (HMMs) were utilized in the related art. RNNs are also applied in the related art for RUL estimation. However, RNN is known to have long-term dependency problems as well as vanishing and exploding gradients.

Related art implementations utilized an HMM approach for prognostics from the perspective of sequence learning. However, due to the limitations of HMM, HMM hidden states must be drawn from a modestly sized discrete state space. HMM computational complexity and storage makes HMM infeasible when the set of possible hidden stages grows large. Further, each hidden state can only depend on the immediately previous state. Markov models have been shown computationally impractical for modeling long-range dependencies.

SUMMARY

Equipment uptime is getting increasingly important across different industries which seek for new ways of increasing equipment availability. Through the use of predictive maintenance, one can reduce increase equipment availability, improve the safety of operators, and reduce the environmental incidents. Detecting faults in the system by condition based maintenance (CBM) may be insufficient, because at the time of fault occurrence, the spare parts might not available or the needed resources (maintainers) are busy. Estimation of remaining useful life of a component (system) models degradation process and predicts the failure time of the component or the time when component performance is below operational requirements. The degradation process of components in the complex systems can be affected by many factors, such as undefined fault modes, operational conditions, environmental conditions, etc. In some cases these factors are not recorded and thus are considered unknown. Therefore, historical data is collection of different degradation patterns all mixed together. With such data, RUL prediction may become complex. In example implementations of the present disclosure, advanced RUL prediction technology are utilized with deep learning in its core.

Recent related art implementations, such as Convolutional Neural Network (CNN), deep Long Short-Term Memory (LSTM), has been shown efficient in applications such as computer vision, image, video, speech and natural language processing. A Deep CNN based RUL estimation approach was utilized in the related art, where the sensor data was cut into sliding windows and then apply Deep CNN on each sliding window. Similarly, Deep CNN also considers each sliding windows independently. Long Short-Term Memory (LSTM) is a type of RNN network for sequence learning tasks and achieved great success on speech recognition and machine translation. Due to inherent sequential nature of sensor data, LSTMs are well-suited for RUL estimation using sensor data. LSTM models will achieve more accurate predictions of RUL than the other models which ignore sequence information. In other related art implementations, LSTMs are used to estimate equipment health index and then other regression techniques are used to map health index to remaining useful life. In our approach we directly model remaining useful life using LSTM model.

Example implementations of the present disclosure are directed to a solution for the problem of predicting RUL. Solutions of the example implementations involve using time sequence sensor data, event data, failure data and operational data. To estimate RUL, example implementations bring all data sources together as well as utilizing sequential relationships in the data to achieve more accurate prediction. Example implementations utilize the following:

Data preparation and processing which can involve outlier removal, and component based sequence construction to generate data in a format consumable by deep learning. During sequence construction, conventional time-scale data can be converted to component operating time-scale data as RUL is expressed in operational time (e.g., data excludes non-operational time such as equipment downtimes, lunch breaks etc.). Further example implementations can utilize criterion definitions for technology to be applied on the collected data (e.g. without compression). Example implementations may also utilize sensor data compression (feature extraction) by applying windows over the data using (a) predefined functions over the windows such as minimum, maximum, percentiles, average, FFT (Fast Fourier Transform) and so on, depending on the desired implementation as well as (b) applying convolutional neural networks (CNNs) for automatic feature extraction. Example implementations may also automatically create a function to label each element of created sequence with corresponding RUL value, which can be utilized for learning model parameters.

In example implementations, the RUL prediction problem is solved for a component of the system by utilizing deep Long Short Term Memory (LSTM) networks by specifying structure of deep LSTM network, defining objective function instead of traditionally used mean squared error (MSE). Such example implementations can involve calculating RUL for a system when comprised of multiple components.

Example implementations as described herein can be applied to applications which require calculation of RUL for either components of the system or a system as a whole.

Aspects of the present disclosure can include a method, which involves processing first sensor data for a plurality of first components of a first type of component to determine a failure acceleration time point, the failure acceleration time point indicative of an inflection time point of failure acceleration for the first type of component; deriving a function for defining remaining useful life for the first type of component based on the failure acceleration time point; and for receipt of second sensor data of a second component being the first type of component, applying the function to the second sensor data to determine the remaining useful life of the second component.

Aspects of the present disclosure can include a computer program, storing instructions for executing a process, which can include processing first sensor data for a plurality of first components of a first type of component to determine a failure acceleration time point, the failure acceleration time point indicative of an inflection time point of failure acceleration for the first type of component; deriving a function for defining remaining useful life for the first type of component based on the failure acceleration time point; and for receipt of second sensor data of a second component being the first type of component, applying the function to the second sensor data to determine the remaining useful life of the second component. The computer program may be stored in a non-transitory computer readable medium.

Aspects of the present disclosure further include an apparatus, which can include a processor, configured to: process first sensor data for a plurality of first components of a first type of component to determine a failure acceleration time point, the failure acceleration time point indicative of an inflection time point of failure acceleration for the first type of component; derive a function for defining remaining useful life for the first type of component based on the failure acceleration time point; and for receipt of second sensor data of a second component being the first type of component, apply the function to the second sensor data to determine the remaining useful life of the second component.

Aspects of the present disclosure can include a system, which can include means for processing first sensor data for a plurality of first components of a first type of component to determine a failure acceleration time point, the failure acceleration time point indicative of an inflection time point of failure acceleration for the first type of component; means for deriving a function for defining remaining useful life for the first type of component based on the failure acceleration time point; and for receipt of second sensor data of a second component being the first type of component, means for applying the function to the second sensor data to determine the remaining useful life of the second component.

BRIEF DESCRIPTION OF DRAWINGS

FIGS. 4(a) to 4(i) illustrate example management information, in accordance with an example implementation.

DETAILED DESCRIPTION

Figure 1:
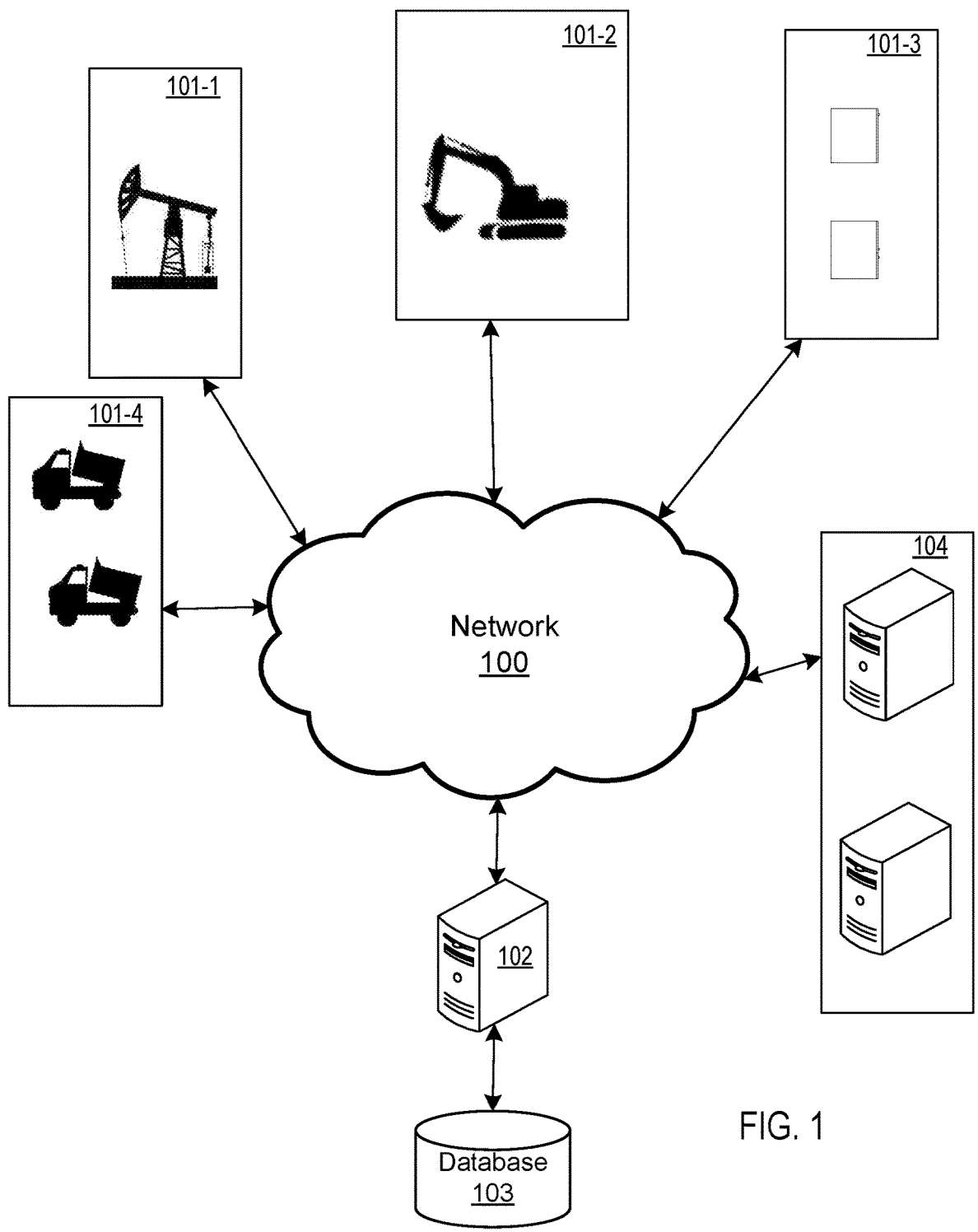
FIG. 1 illustrates a system involving and a management apparatus, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates a system involving and a management apparatus, in accordance with an example implementation. One or more equipment or equipment systems 101-1, 101-2, 101-3, and 101-4 are communicatively coupled to a network 100 which is connected to a management apparatus 102 (or a server 102). The management apparatus 102 manages a database 103, which contains data (e.g. sensor) aggregated from the equipment and equipment systems in the network 100. The database can be included in the management apparatus in alternative example implementations. Moreover in alternate example implementations, the data from the equipment and equipment systems 101-1, 101-2, 101-3, and 101-4 can be aggregated to a central repository or central database such as proprietary databases that aggregate data from equipment or equipment systems such as enterprise resource planning systems, and the management apparatus 102 can access or retrieve the data from the central repository or central database. In addition, there may be one or more additional apparatuses 104 that can be configured to transmit recorded operational data, event data and fault data of equipment and equipment systems 101-1, 101-2, 101-3, 101-4 to management apparatus 102, and may receive the same from equipment systems 101-1, 101-2, 101-3, and 101-4.

Figure 2:
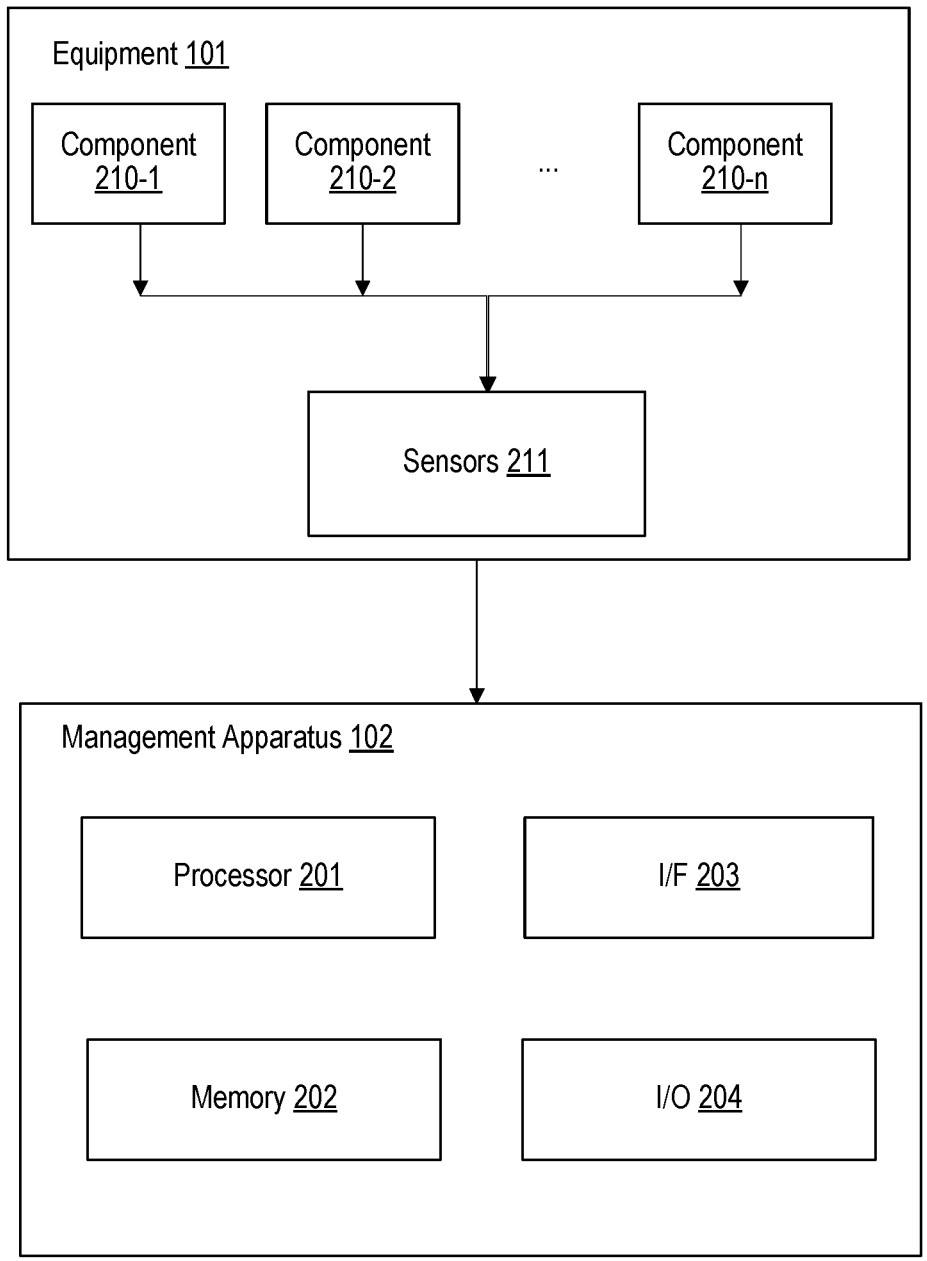
FIG. 2 illustrates an example system diagram upon which example implementations can be implemented.

FIG. 2 illustrates an example system diagram upon which example implementations can be implemented. In this example, there is a management apparatus 102 communicatively coupled to a plurality of sensors 211 of an equipment or equipment system 101. The equipment may include a plurality of sensors 211. The sensors 211 can be individual sensors placed within the equipment or equipment system 101, or can be an array of sensors coupled to the components 210-1, 210-2, 210-n of the equipment or equipment system 101, or can be implemented in other ways in accordance with a desired implementation. In the example depicted of FIG. 2, the equipment 101 is depicted as external from the management apparatus 102, however other implementations are also possible. For example, the management apparatus 102 can be implemented within the equipment 101 and be configured to provide the results to an external server. Components 210-1, 210-2, 210-n can be individual parts or components of an equipment or apparatus, or can be equipment within an equipment system, or any other apparatus where remaining useful life estimation is desired according to the desired implementation.

Management apparatus 102 may include processor 201, memory 202, network interface (I/F) 203 and input/output (I/O) interface 204. Processor 201 is configured to load one or more programs from memory 1502 and execute them to facilitate the functionality as described in the example implementations. Memory 202 may also be configured to store sensor data of the equipment 101, which can be retrieved from an external database or from storage devices. Network I/F 203 is configured to interact with equipment or equipment system 101 through network 100, and can also interact with one or more additional apparatuses 104 through network 100. I/O interface 204 can provide output to a display, and process input through keyboard, mouse, touchscreen, and other interfaces according to the desired implementation.

In example implementations, processor 201 may be configured to process first sensor data for a plurality of first components of a first type of component to determine a failure acceleration time point, the failure acceleration time point indicative of an inflection time point of failure acceleration for the first type of component; derive a function for defining remaining useful life for the first type of component based on the failure acceleration time point; and for receipt of second sensor data of a second component being the first type of component, applying the function to the second sensor data to determine the remaining useful life of the second component as described with respect to FIGS. 7-10. Further, the receipt of the second sensor data and the application of the function to the second sensor data to determine the remaining useful life of the second component can be conducted at the component level instead of the management apparatus level, depending on the desired implementation. For example, once the model for the type of component is generated, the model can be pushed onto the components of the same type, whereupon the derivation of RUL based on sensor data is conducted at the component level.

Figure 10:
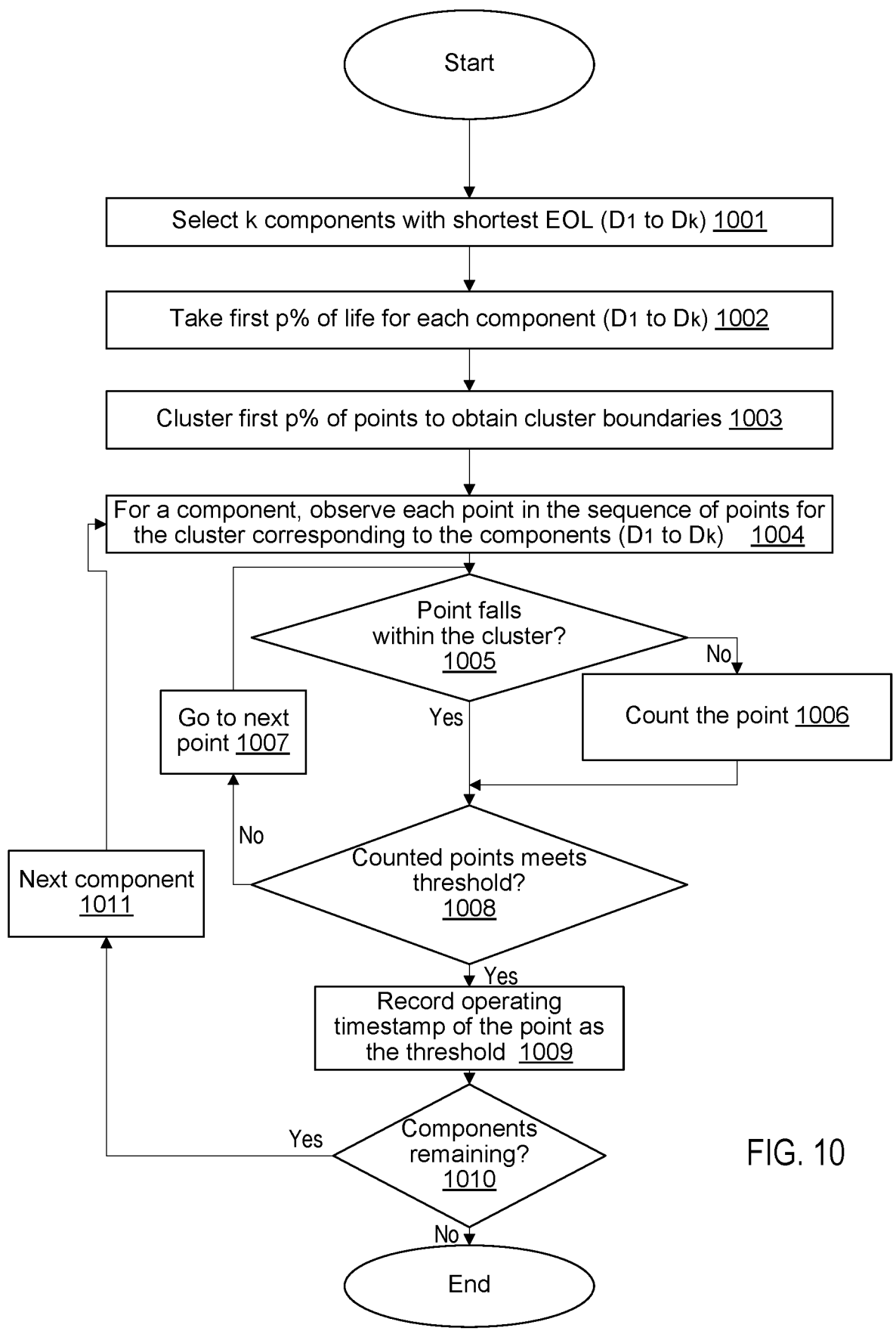
FIG. 10 illustrates an example flow diagram in accordance with an example implementation.

Processor 201 may be configured to process the first sensor data for the plurality of first components of the first type of component to determine the failure acceleration time point by selecting a set of the plurality of the first components having an end of life having a shortest end of life within the plurality of first components; generating one or more clusters for a first portion of the first sensor data of the set of the plurality of the first components; and for each component in the set, counting subsequent data points in a remaining portion of the first data of the each component until a number of the each subsequent data point falling outside the one or more clusters reaches a threshold; recording timestamp of data point from the subsequent data point at the threshold as the failure acceleration time point of the each component in the set; and derive the failure acceleration time point based on an average of the failure acceleration time point of the each component in the set as illustrated with respect to the flow diagram of FIG. 10.

Processor 201 may be configured to derive the function for defining remaining useful life for the first type of component based on the failure acceleration time point by applying long-short term memory modeling to the first sensor data for the plurality of first components to derive objective function parameters based on the failure acceleration time point and predicted remaining useful life over time; and using the objective function parameters to derive the function for defining remaining useful life for the first type of component as illustrated in FIGS. 7 to 10.

Processor 201 may be configured to conduct the processing the first sensor data for the plurality of first components of the first type of component to determine the failure acceleration time point by compressing the first sensor data into one or more time windows as illustrated in FIGS. 4(a) to 4(i).

Processor 201 may be configured to conduct the compressing the first sensor data into one or more time windows by adjusting the time period based on a ratio of a component average life for the first type of component and a frequency of the first sensor data; and aggregating the first sensor data according to the time period as described in FIGS. 4(a) to 4(i) and FIG. 5.

Processor 201 may be configured to conduct the processing the first sensor data for the plurality of first components of the first type of component to determine the failure acceleration time point by, for each of the plurality of first components, excluding data from the first sensor data corresponding to time periods in which the each of the plurality of first components is not in operation, and converting the first data into a multivariate sequence of operating time periods based on periods in which the each of the plurality of first components are in operation as described in FIGS. 4(a) to 4(i).

Processor 201 may be configured to, for a system including a plurality of second components associated with a plurality of types of components, applying associated functions for defining remaining useful life for each of the plurality of types of components and determining remaining useful life for the system based on a minimum remaining useful life determined from the applying of the associated functions for defining remaining useful life for each of the plurality of types of components.

Figure 3:
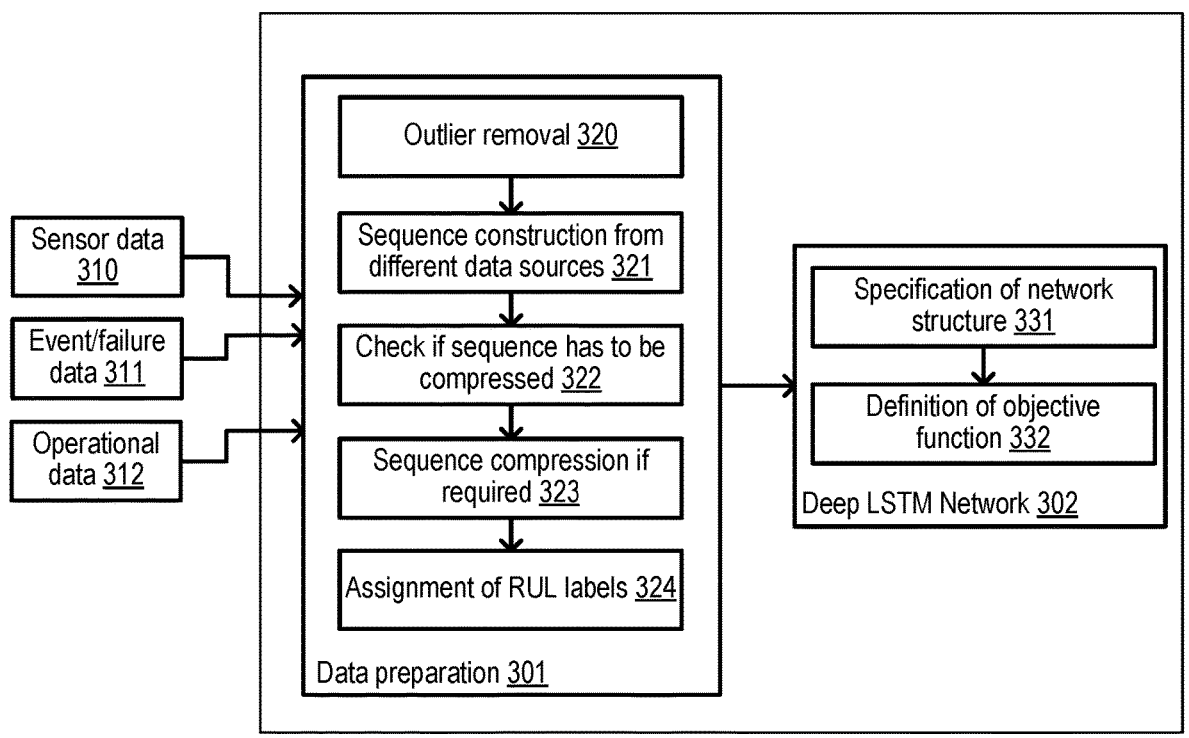
FIG. 3 illustrates an example overview of an implementation of deep LSTM RUL modeling, in accordance with an example implementation.

FIG. 3 illustrates an example overview of an implementation of deep LSTM RUL modeling, in accordance with an example implementation. The methodology for Deep LSTM RUL modeling utilizes aspects, which can include data preparation 301 where data is formatted for Deep LSTM model, deep LSTM model learning for a specified objective function 302, which thereby facilitates the calculating the RUL for a system of multiple components. In one example implementation, the processor 201 in the management apparatus 102 is configured to execute the data preparation 301, and the deep LSTM RUL model learning 302.

Data input for RUL predictions is a set of time sequences generated from sensor measurements 310, event and failure data 311, and operational data 312. Event and failure data 311 and operational data 312 can include data generated during the operations of the component/system which might be relevant to the problem of RUL prediction. Several aspects can be utilized by example implementations perform before learning deep LSTM model, which includes outlier removal 320, sequence construction 321, compression criterion definition 322, data compression 323 (if required according to the desired implementation), and RUL label definition 324.

During outlier removal 320, the data preparation process is configured to detect outliers in the sensor readings and remove or replace them with values calculated based on other readings of the same sensor (e.g., average of nearest neighbors, interpolation).

During sequence construction from different data sources 321, the data preparation process constructs sequences for each component for Deep LSTM model based on data collected from different sources as illustrated in FIGS. 4(a) to 4(d) and obtain data in a tabular format whose columns represent the sensors or event types and each row represents the sensor readings or event existence at a unique timestamp as shown in FIG. 4(i). In the example of FIGS. 4(a) to 4(d), such data sources can include sensor data (FIG. 4(a), FIG. 4(b)), operating conditions (FIG. 4(c)) and recorded events on the component (FIG. 4(d)), however, other information may also be utilized depending on the desired implementation. Timestamps in FIG. 4(i) refer to operating time since component of interest is installed or since data collection is started. The rows from this tabular format are referred to as data records (elements of a sequence). The sequence refers to component life from installation to failures. In example implementations, constructed data can carry information about a sequence which is identified by component ID as illustrated in FIG. 4(a). The sequence construction process proceeds as follows:

1. Transform regular timescale of sensor measurement and events to operating time scale. This includes removal of sensor data when equipment was not operating and then mapping of sensor timestamps to component operating time, as illustrated in FIGS. 4(a) to 4(g).

2. Generate a common multivariate sequence of operating timestamps for the output data. The common sequence of operating timestamps can be generated using the operating timestamps of one of the sensors (e.g., the one with the largest number of readings). Example implementations estimate other sensors values at each common timestamp by interpolating the readings of the sensors at nearby operating timestamps. The estimation can be conducted by learning a regression model for the original time series and finding the values of regression function at the common timestamps. Transform event data to time sequence by using binary encoding for each type of event. For each event type, assign '1' to the closest common timestamp from the event occurrence and '0' to all other common timestamps. FIG. 4(a) illustrates a sample output of this process. The generation of the common multivariate sequence is illustrated in FIGS. 4(e) to 4(h). That is, based on the sensor data (FIGS. 4(e), 4(f)) and event data (FIG. 4(g)) and if applicable, operating conditions (e.g., component is running/not running), the data is placed through the transformation process as described above to produce FIG. 4(h). Thus, example implementations conduct the processing the sensor data for the components of the same type by, for each of the plurality of first components, excluding data from the first sensor data corresponding to time periods in which the each of the plurality of first components is not in operation, and converting the first data into a multivariate sequence of operating time periods based on periods in which the each of the plurality of first components are in operation.

Further, through the application of data compression, example implementations can thereby process sensor data for components or equipment of the same type by compressing the first sensor data into one or more time windows. Such data compression can be utilized to determine the failure acceleration time point as illustrated in FIGS. 7 to 10.

Depending of computational resources, learning parameters of the model can be prohibitively slow from the user perspective. Computational time can be controlled by length of the sequence and by the structure of deep LSTM models. Therefore, example implementations facilitate the definition of a condition (e.g., if data compression is necessary) to avoid huge learning time at 322. In an example implementation, the length of the sequence can be used as a criterion and is defined as Component_Average_Life/Data_Frequency<Threshold Component_Average_Life is average life of component for which RUL is going to be estimated. Data_Frequency is gap between samples in the data. Data_Frequency for the data from FIG. 4(h) is 5 min. The above-defined condition checks if the length of the sequence is less than user-defined threshold. Threshold can depends on dimensionality of the problem and the structure of the network and can be experimentally determined by the user, or determined by any method according to the desired implementation. If necessary, data compression can be performed.

During the data compression aspect 323, example implementations apply functions over sensor data using non-overlapping or sliding time-windows. Examples of such functions are min, max, mean, and so on, depending on the desired implementations. Further, example implementations can apply convolutional neural networks (CNNs) to generate such features. In example implementations, sensor measurements can be replaced over time-windows with new values which are: (a) outputs of the functions (FIG. 5) or (b) outputs of CNNs (FIG. 6). Thus, example implementations can conduct the compressing of sensor data into one or more time windows by adjusting the time period based on a ratio of a component average life for the first type of component and a frequency of the first sensor data; and aggregating the first sensor data according to the time period.

Figure 5:
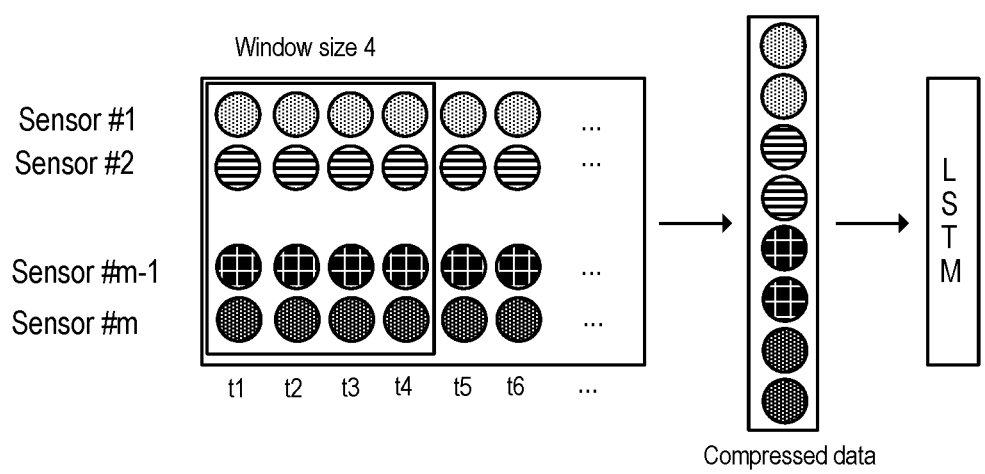
FIG. 5 illustrates an application of two functions to compress data, in accordance with an example implementation.
Figure 6:
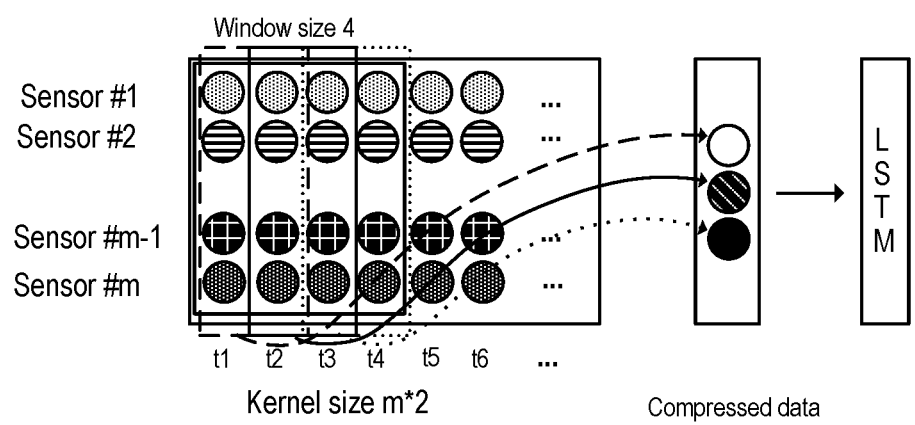
FIG. 6 illustrates an example of CNN application for data compression, in accordance with an example implementation.

FIG. 5 illustrates an application of two functions to compress data, in accordance with an example implementation. By applying functions over the windows, example implementations can increase the number of dimensions as multiple sequences will be obtained from one sensor. As shown in the example of FIG. 5, the two functions as applied to the windows result in the selection of data from the window for use in the LSTM.

Figure 7:
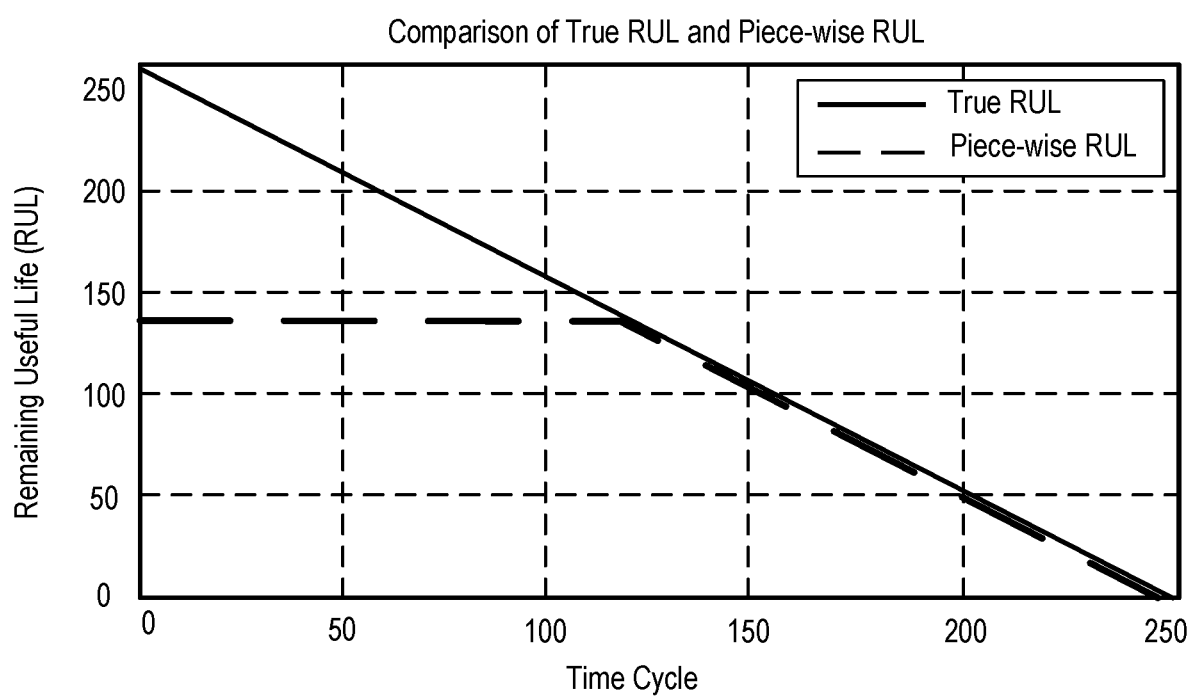
FIG. 7 illustrates an example comparison of the true RUL and the piece-wise RUL, in accordance with an example implementation.

FIG. 6 illustrates an example of CNN application for data compression, in accordance with an example implementation. In the example of FIG. 6, one kernel is used over the window, however, multiple kernels can be utilized in accordance with the desired implementation. Similar to FIG. 5, the number of dimensions can be increased if multiple kernels are used for convolution. New operating time stamps can be centers of the window. In the example illustrated in FIG. 4(i), sensor data is compressed from 5 min (FIG. 4(h)) resolution to 2 hour resolution, to provide the compressed multivariate sequence of data for the component as shown in FIG. 4(i). New sequences can be created by example implementations by replacing raw sensor measurements by mean and max values. Events will be processed separately and they will be assigned to the windows in which they appear. Newly generated compressed sequences are aligned to the same equally spaced time-stamps. Size of the windows can be defined by users depending on compression criterion or in accordance with the desired implementation. As shown in FIG. 6, the application of CNN application FIG. 7 illustrates an example comparison of the true RUL and the piece-wise RUL, in accordance with an example implementation. From the historical data of each component the end-of-life (EOL) can be retrieved in terms of operating units (e.g., hours). To learn a model, example implementations label every instance in the constructed sequence with corresponding RUL at 324. In an example implementation to label sequences, the corresponding RUL is calculated as the time difference between end of life (EOL) and sequence timestamps, as illustrated by True RUL in FIG. 7 as an example. On the other hand, when equipment is healthy, sensor data may not show any degradation and may be stable. In such a case, it can be difficult to predict RUL (e.g. RUL may not be predicted if there is no degradation) and therefore a straightforward approach may introduce huge noise in the training data. To achieve improved labeling, example implementations can also involve a RUL piece-wise target function in the form $$RUL_t = \begin{cases} f(EOL, t), & t \geq EOL - const \\ const, & t < EOL - const \end{cases}$$

where const defines upper limit of RUL and refers to healthy equipment. Default choice of $f$ is linear $f(EOL, t)=EOL-t$ while user can change to other functional forms. One of the examples of such a function is piece-wise linear functions where domain based upper limit of RUL was set to 130. Functional forms of RULs from the example in FIG. 7 are True RUL: $RUL_t = EOL - t$ Piece-wise RUL: $RUL_t = \begin{cases} EOL - t, & t \geq EOL - 130 \\ 130, & t < EOL - 130 \end{cases}$ As shown in FIG. 7, the piece-wise linear function reflects a failure acceleration time point, which is an inflection time point from which failure of the component or equipment starts to accelerate. The inflection point can be determined as EOL−const from which the function for RUL changes and starts to accelerate, wherein the RUL can remain constant in the time periods before the failure acceleration time point.

Example implementations can also utilize automatic calculation of upper limit of RUL. In example implementations, k components are selected, which have the lowest values of EOL as they would first get "unhealthy" in terms of operating time. Using the data form these components, k multivariate sequences are obtained from applying data preparation steps. Initially, example implementations take into consideration data from first p percent (usually 5%) of components total life which would be referred as "healthy" condition. Example implementations cluster the first p percent of data into one or more clusters by using any of known clustering techniques such as k-means, spectral clustering, and so on in accordance with a desired implementation. Thereafter, for each element of k multivariate sequences example implementations calculate the distance to the closest cluster. In the case of k-means that would be Euclidean distance to the closest cluster center. In some other cases distance measure can be one minus probability that measurement belongs to particular cluster. The calculated distance may also increase as the distance moves closer to failure. As the sequences are traversed and the points are counted, the distance to the closest cluster eventually crosses the threshold defined by user or by the desired implementation. Example implementations observe the timestamp once the count reaches $n_{threshold}$ and denote it as $t_{thres}$. For each of k components the procedure will generate different $t_{thres}$. Finally, the upper limit of RUL as $$const = \frac{1}{k} \sum_{i=1}^{k} (EOL_k - t_{thres_k})$$

Further description of the calculation for the upper limit of RUL is provided in FIG. 10. Example implementations may be configured to process the first sensor data for the plurality of first components of the first type of component to determine the failure acceleration time point by selecting a set of the plurality of the first components having an end of life having a shortest end of life within the plurality of first components; generating one or more clusters for a first portion of the first sensor data of the set of the plurality of the first components; and for each component in the set, counting subsequent data points in a remaining portion of the first data of the each component until a number of the each subsequent data point falling outside the one or more clusters reaches a threshold; recording timestamp of data point from the subsequent data point at the threshold as the failure acceleration time point of the each component in the set; and derive the failure acceleration time point based on an average of the failure acceleration time point of the each component in the set.

Due to the variance in the value scale over different sensors, sensor data need to be normalized with respect to each sensor before any training and testing of LSTM models. Either z-score or min-max normalization should be used which are defined as:

$$x'_i = \frac{x_i - \mu_i}{\sigma_i} \quad \text{Z-score normalization}$$

$$x'_i = \frac{x_i - \min x_i}{\max x_i - \min x_i} \quad \text{Min-max normalization}$$

Figure 8:
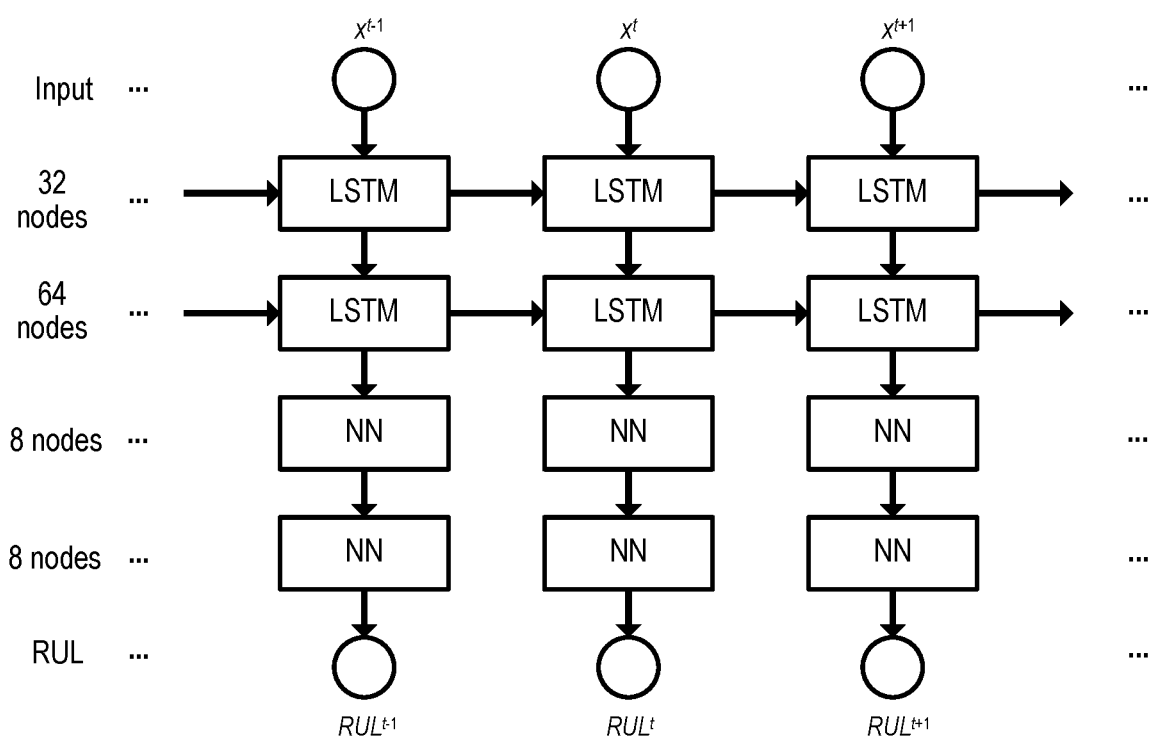
FIG. 8 illustrates an example of the Deep LSTM model for RUL estimation, in accordance with an example implementation.

FIG. 8 illustrates an example of the Deep LSTM model for RUL estimation, in accordance with an example implementation. The deep LSTM model is type of recurrent neural network which uses Long-Short Term Memory cells in the recurrent layer. Specifically, the processes of the Deep LSTM Network 302 of FIG. 3 involve the specification of a network structure 331, and a definition of an objective function 332, wherein FIG. 8 illustrates an example network structure that can be specified at 331. Deep structure involves multiple LSTM layers and multiple standard neural network layers. The number of layers and number of memory cells or hidden nodes in each of the layers can be problem dependent. In the example of FIG. 8, there are two LSTM layers and two neural network layers. The first LSTM layer contains 32 memory cells while second contains 64 memory cells. Both neural network layers contain 8 nodes.

At time t, Deep LSTM model takes the p-dimensional measurement data $x_t$ as input data and output the predicted $RUL_t$. As time progresses, the LSTM networks' state will be updated along with time. The output and hidden state $(h_{t-1})$ of LSTM at time t−1 will serve as input of LSTM at time t as indicated in FIGS. 8 and 9.

Figure 9:
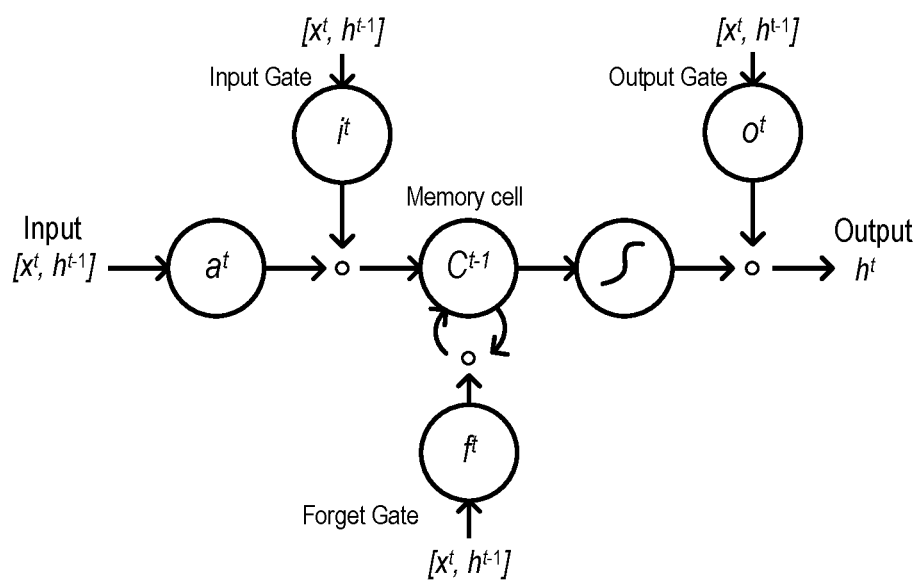
FIG. 9 illustrates a LSTM cell, in accordance with an example implementation.

FIG. 9 illustrates a LSTM cell, in accordance with an example implementation. FIG. 9 also shows structure of one LSTM cell at time t−1. This cell has three gates that control the information flow: input gate $i^t$, output gate $o^t$, and forget gate $f^t$. All gates are functions of p-dimensional measurement data $x_t$ and hidden state $(h_{t-1})$ from previous timestamp. These functions are in the form f(Wx+Uh+b), where Ws, Us, bs are parameters that has to be learned.

To learn the Deep LSTM model, the objective function needs to be defined at 332. Usually in regression tasks mean squared error (MSE) is used. MSE imposes that errors in prediction over time are equally important. However, in some example implementations of RUL there is a need to allow users to penalize errors differently with respect to time. Therefore in example implementations, the objective function can be user defined with constraint that it has to be differentiable. If the output of LSTM model is denoted as $\overline{RUL}_t$=LSTM(w, $x_t$, $h_{t-1}$), where w represent all parameters of LSTM, then optimization of objective function can be in the form $$\underset{w}{\operatorname{argmin}} \sum_{seq} \sum_{t} f_{obj}(RUL_{seq,t}, LSTM(w, x_{seq,t}, h_{seq,t-1}), t)$$

The parameters of Deep LSTM model (w) are learned using stochastic gradient decent (SCD) to optimize above-defined objective function.

Thus from the application of LSTM as illustrated in FIG. 8 and FIG. 9, example implementations derive a function for defining remaining useful life for the first type of component based on the failure acceleration time point derived from FIG. 7. The remaining useful life function can then be applied to estimate remaining useful life for subsequent components being the same type of component as the one utilized to derive the function. As illustrated in FIGS. 8 and 9, the function for defining remaining useful life can be derived for a type of component based on the failure acceleration time point by applying long-short term memory modeling to sensor data across many of the same type of components to derive objective function parameters based on the failure acceleration time point and predicted remaining useful life over time (e.g., the predicted RUL before applying LSTM); and using the objective function parameters to derive the function for defining remaining useful life for the type of component.

When the system includes multiple components, each component can be analyzed separately by creating component specific LSTM model. If there are c components then c independent LSTM models will be learned to predict RULs for each component. Then the RUL of the whole system at any timestamp can be calculated as:

$$RUL_t = \min\{RUL_{t,n} | n=1,2, \ldots, c\}$$

Example implementations can thereby be extended to systems having multiple types of components through the generation of RUL functions for each of the types of components as described in FIGS. 7-10. In such systems, example implementations can apply the associated functions for defining remaining useful life for each of the components in the system based on type, and determine remaining useful life for the system based on a minimum remaining useful life determined from the applying of the associated functions for defining remaining useful life for each of the plurality of types of components. That is, when the component that has the shortest RUL fails, it is presumed that the system thereby fails, and the RUL can be expressed as in terms of the length of the shortest RUL determined from the components in the system.

FIG. 10 illustrates a flow diagram for clustering to determine a threshold $t_{threshk}$ which is used to calculate the upper limit of RUL, in accordance with an example implementation. At 1001, the flow begins by selecting k components with the shortest EOL, denoted as $D_1$ to $D_k$. $D_1$ to $D_k$ are the same type of component. The list of components from $D_1$ to $D_k$ can be determined through any sorting algorithm to determine the k components having the shortest EOL. At 1002, the first p % of data points (e.g. first 5% of lifetime, first 10% of lifetime, etc.) for each component ($D_1$ to $D_k$) is obtained, as the component is known to be healthy during those points. At 1003, the first p % of data points are clustered through a clustering algorithm to obtain cluster boundaries. At 1004, for a component $D_n$ where n is denoted as the component selected from $D_1$ to $D_k$, observe each point of $D_n$ in the sequence of points for the one or more clusters corresponding to the components $D_1$ to $D_k$. At 1005, a determination is made as to if the point falls within one or more clusters. If so (Yes), then the flow proceeds to 1008, otherwise (No), the flow proceeds to 1006 to count the point. At 1008, a determination is made as to whether the number of counted points meets the threshold. If so (Yes), then the flow proceeds to 1009, otherwise (No), the flow proceeds to 1007 to proceed to the next point. At 1009, the operating timestamp of the point that meets the threshold is recorded as $t_{threshk}$ for the one of the components $D_n$ and the flow proceeds to 1010 to determine if there are any components left to traverse. If so (Yes), then the flow proceeds to 1011 to proceed to the next component $D_{n+1}$ from $D_1$ to $D_k$, and then proceeds back to 1004, otherwise (No), the flow ends. From this example implementation, $t_{threshk}$ can be obtained for each component from $D_1$ to $D_k$, which can then be utilized to derive the upper limit of RUL, const, as described in FIG. 7, which can then be utilized to derive the RUL function for the component type.

Through use of example implementations, enhanced monitoring of equipment and the respective components can be conducted, and maintenance can be conducted accordingly (e.g., repair or replacement). In an example implementation, an apparatus executing the example implementations can be connected (e.g. communicatively, directly) to a system having components and configured to monitor the components. In such an example implementation, should the RUL fall below a desired threshold, such an apparatus can flag the component or the system, whereupon maintenance processes can be executed either by the apparatus or manually. Example implementations can involve transmitting alerts to the system administrator, or can involve transmitting messages to the system to indicate that the system or the components are in need of maintenance.

In another example implementation, the apparatus can be in the form of an operations center configured to maintain and monitor various equipment for a location (e.g. a factory, a mining or digging site, a data center, etc.), wherein an administrator can be alerted when the RUL for a component or an equipment falls below a threshold, or if the equipment or component can undergo maintenance through the operations center, initiate maintenance on the component or equipment.

Through the example implementations described above, it is possible to have a predictive maintenance system to indicate when maintenance or replacement should be done for equipment and components, thereby reducing the risk of unanticipated component or equipment failure and also facilitating effective maintenance schedules for managed equipment and components.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising: processing first sensor data for a plurality of first components of a first type of component to determine a failure acceleration time point, the failure acceleration time point indicative of an inflection time point of failure acceleration for the first type of component, wherein the first sensor data is time sequence data points, wherein the processing the first sensor data for the plurality of first components of the first type of component to determine the failure acceleration time point comprises:
   selecting a set of the plurality of the first components having a shortest end of life within the plurality of first components;
   generating one or more clusters for a first portion of the first sensor data of the set of the plurality of the first components, wherein the first portion of the first sensor data is a portion of the time sequence data points earlier in time than time sequence data points of a remaining portion of the first sensor data;
   for each component in the set:
      counting subsequent time sequence data points in the remaining portion of the first sensor data of a respective component until a number of the subsequent time sequence data points falling outside the one or more generated clusters reaches a threshold number;
      recording a timestamp of a data point from the subsequent time sequence data point at the threshold number as the failure acceleration time point of the respective component in the set; and
      deriving the failure acceleration time point based on an average of the failure acceleration time point of the each component in the set;
   training a deep long-short term memory model to derive objective function parameters based on the failure acceleration time point and predicted remaining useful life over time;
   deriving a function for defining remaining useful life for the first type of component based on the failure acceleration time point;
   for receipt of second sensor data from a second component being the first type of component, applying the function to the second sensor data to determine the remaining useful life of the second component; and
   performing a maintenance process on the second component based on the determined remaining useful life of the second component being below a useful life threshold.

2. The method of claim 1, wherein the deriving the function for defining remaining useful life for the first type of component based on the failure acceleration time point comprises:
   using the objective function parameters to derive the function for defining remaining useful life for the first type of component.

3. The method of claim 1, wherein the processing the first sensor data for the plurality of first components of the first type of component to determine the failure acceleration time point comprises compressing the first sensor data into one or more time windows.

4. The method of claim 3, wherein the compressing the first sensor data into one or more time windows comprises:
   adjusting the time window based on a ratio of a component average life for the first type of component and a frequency of the first sensor data; and aggregating the first sensor data according to the time window.

5. The method of claim 1, wherein the processing the first sensor data for the plurality of first components of the first type of component to determine the failure acceleration time point comprises:
for each of the plurality of first components, excluding data from the first sensor data corresponding to time periods in which the each of the plurality of first components is not in operation,
converting the first sensor data into a multivariate sequence of operating time periods based on periods in which the each of the plurality of first components are in operation.

6. The method of claim 1, further comprising:
for a system comprising a plurality of second components associated with a plurality of types of components, applying associated functions for defining remaining useful life for each of the plurality of types of components and determining remaining useful life for the system based on a minimum remaining useful life determined from the applying of the associated functions for defining remaining useful life for each of the plurality of types of components.

7. An apparatus, comprising: a processor, configured to: process first sensor data for a plurality of first components of a first type of component to determine a failure acceleration time point, the failure acceleration time point indicative of an inflection time point of failure acceleration far the first type of component, wherein the first sensor data is time sequence data points, wherein the processing the first sensor data for the plurality of first components of the first type of component to determine the failure acceleration time point comprises:
select a set of the plurality of the first components having a shortest end of life within the plurality of first components;
generate one of more clusters for a first portion of the first sensor data of the set of the plurality of the first components, wherein the first portion of the first sensor data is a portion of the time sequence data points earlier in time than time sequence data points of a remaining portion of the first sensor data,
for each component in the set:
count subsequent time sequence data points in the remaining portion of the first sensor data of a respective component until a number of the subsequent time sequence data point failing outside the one or more generated clusters reaches a threshold number;
record a timestamp of a data point from the subsequent time sequence data points at the threshold number as the failure acceleration time point of the respective component in the set; and
derive the failure acceleration time point based on an average of the failure acceleration time point of the each component in the set;
train a deep long-short term memory model to derive objective function parameters based on the failure acceleration time point and predicted remaining useful life over time;
derive a function for defining remaining useful life for the first type of component based on the failure acceleration time point;
for receipt of second sensor data from a second component being the first type of component, apply the function to the second sensor data to determine the remaining useful life of the second component; and
perform a Maintenance process on the second component based on the determined remaining useful life of the second component being below a useful life threshold.

8. The apparatus of claim 7, wherein the processor is configured to derive the function for defining remaining useful life for the first type of component based on the failure acceleration time point by:
using the objective function parameters to derive the function for defining remaining useful life for the first type of component.

9. The apparatus of claim 7, wherein the processor is configured to process the first sensor data for the plurality of first components of the first type of component to determine the failure acceleration time point comprises compressing the first sensor data into one or more time windows.

10. The apparatus of claim 9, wherein the processor is configured to compress the first sensor data into one or more time windows by:
adjusting the time window based on a ratio of a component average life for the first type of component and a frequency of the first sensor data; and
aggregating the first sensor data according to the time window.

11. The apparatus of claim 7, wherein the processor is configured to process the first sensor data for the plurality of first components of the first type of component to determine the failure acceleration time point by:
for each of the plurality of first components, excluding data, from the first sensor data corresponding to time periods in which the each of the plurality of first components is not in operation,
converting the first sensor data into a multivariate sequence of operating time periods based on periods in which the each of the plurality of first components are in operation.

12. The apparatus of claim 7, wherein the processor is configured to:
for a system comprising a plurality of second components associated with a plurality of types of components, applying associated functions for defining remaining useful life for each of the plurality of types of components and determining remaining useful life for the system based on a minimum remaining useful life determined from the applying of the associated functions for defining remaining useful life for each of the plurality of types of components.

13. A non-transitory computer readable medium, storing instructions for executing a process, the instructions comprising: processing first sensor data for a plurality of first components of a first type of component to determine a failure acceleration time point, the failure acceleration time point indicative of an inflection time point of failure acceleration for the first type of component, wherein the first sensor data is time sequence data points, wherein the processing the first sensor data for the plurality of first components of the first type of component to determine the failure acceleration time point comprises:
selecting a set of the plurality of the first components having a shortest end of life within the plurality of first components;
generating one or more clusters for a first portion of the first sensor data of the set of the plurality of the first components, wherein the first portion of the first sensor data is a portion of the time sequence data points earlier in time than time sequence data points of a remaining portion of the first sensor data;
for each component in the set;

counting subsequent time sequence data points in the remaining portion of the first sensor data of a respective component until a number of the subsequent time sequence data points falling outside the one or more generated clusters reaches a threshold number;

recording a timestamp of a data point from the subsequent time sequence data point at the threshold number as the failure acceleration time point of the respective component in the set; and deriving the failure acceleration time point based on an average of the failure acceleration time point of the each component in the set;

training a deep long-short term memory model to derive objective function parameters based on the failure acceleration time point and predicted remaining useful life over time;

deriving a function for defining remaining useful life for the first type of component based on the failure acceleration time point;

for receipt of second sensor data from a second component being the first type of component, applying the function to the second sensor data to determine the remaining useful life of the second component, and performing a maintenance process on the second component based on the determined remaining useful life of the second component being below a useful life threshold.

* * * * *